United States Patent
Arp et al.

(10) Patent No.: US 7,526,743 B2
(45) Date of Patent: Apr. 28, 2009

(54) METHOD FOR ROUTING DATA PATHS IN A SEMICONDUCTOR CHIP WITH A PLURALITY OF LAYERS

(75) Inventors: Andreas Arp, Schoenaich (DE); Juergen Koehl, Weil im Schoenbuch (DE); Matthias Ringe, Bonn (DE)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 11/161,159

(22) Filed: Jul. 25, 2005

(65) Prior Publication Data

US 2006/0044932 A1    Mar. 2, 2006

(30) Foreign Application Priority Data

Jul. 23, 2004    (EP)    ................... 04103542

(51) Int. Cl.
*G06F 17/50*    (2006.01)
(52) U.S. Cl. ................. 716/12; 716/6; 716/13
(58) Field of Classification Search ......... 716/13
See application file for complete search history.

(56) References Cited

U.S. PATENT DOCUMENTS

| | | | |
|---|---|---|---|
| 5,850,537 A * | 12/1998 | Selvidge et al. ............. | 716/12 |
| 5,971,596 A * | 10/1999 | Nishikawa ................. | 716/10 |
| 6,099,583 A * | 8/2000 | Nag ......................... | 716/16 |
| 6,122,443 A * | 9/2000 | Nishikawa ................. | 716/8 |
| 6,507,938 B1 * | 1/2003 | Roy-Neogi et al. .......... | 716/10 |
| 6,915,361 B2 * | 7/2005 | Alpert et al. ............... | 710/52 |
| 7,296,246 B1 * | 11/2007 | Kuehlmann et al. .......... | 716/2 |
| 7,312,631 B1 * | 12/2007 | Bauer et al. ................. | 326/38 |
| 2003/0051222 A1 * | 3/2003 | Williams et al. ............ | 716/12 |
| 2003/0167451 A1 * | 9/2003 | Igarashi .................... | 716/5 |
| 2006/0010413 A1 * | 1/2006 | Curtin et al. ................ | 716/9 |
| 2006/0095872 A1 * | 5/2006 | McElvain et al. ............ | 716/1 |
| 2006/0190886 A1 * | 8/2006 | Lu et al. .................... | 716/6 |
| 2008/0046850 A1 * | 2/2008 | Curtin et al. ................ | 716/6 |
| 2008/0112441 A1 * | 5/2008 | Hathaway et al. .......... | 370/519 |

* cited by examiner

*Primary Examiner*—Paul Dinh
*Assistant Examiner*—Suchin Parihar
(74) *Attorney, Agent, or Firm*—Michael J. LeStrange

(57) ABSTRACT

The present invention relates to a method for routing data paths in a semiconductor chip with a plurality of layers. The inventive method comprises the steps of wiring a launching clock path and a receiving clock path on one or more layers according to at least one predetermined condition, performing one or more timing tests for determining any critical paths, and determining a weight function for every layer of each critical path. Said weight function is defined as the difference between a property of the launching clock tree and the same property of the receiving clock tree on said layer. If said weight function is positive for any layer, the wiring of the data path is not allowed on said layer. Preferably the remaining layers are chosen in such a way that a local variation of the delay on said layer is minimal.

25 Claims, 5 Drawing Sheets

METHOD FOR ROUTING DATA PATHS IN A SEMICONDUCTOR CHIP WITH A PLURALITY OF LAYERS

FIELD OF THE INVENTION

The present invention relates to a method for routing data paths in a semiconductor chip with a plurality of layers. In particular, the invention relates to a method for routing data paths that reduces the sensitivity of the chip design to manufacturing variations and their influence on design timing.

BACKGROUND OF THE INVENTION

The relative impact of manufacturing variations to the performance of integrated circuits increases dramatically from technology node to technology node. Extensive research has been commenced recently to improve timing analysis capabilities as a means of compensating for manufacturing variations.

Critical dimensions are scaling faster than our control of them. Thus, the variability of physical dimensions, such as the effective length of a transistor channel, is proportionately increasing.

In previous technologies, variability was dominated by the front-end-of-the-line, or active transistors and gates. With recent technology generations, the back-end-of-the-line or interconnect metallization has also shown large variability. These sources of variability are not correlated to the former, and further not correlated from one metal level to another due to differences in geometry and metallurgy from layer to layer.

The variation of the different parameters can be split into two major components. The first component is the deviation from the average for one particular chip, which may be characterized as local variation. The second component is the deviation of the average over different chips, which is known as global variation. FIG. 1 shows a schematic diagram with a probability distribution 10 of the local variations and a probability distribution 12 of the global variations. In FIG. 1, point A is the left end point of the local variation 10, point B is the right end point of the local variation 10, C is the left end point of the global variation 12 and D is the right end point of the global variation 12.

While analyzing, for example setup timing on a single chip, the smaller spread of the local variation 10 shown in FIG. 1 is assumed. The larger spread of the global variation 12 will not occur on the same chip. However, it is not known, where the center point of the distribution is located, of the local variation 10 relative to the global variation 12.

A worst case is explained by the following example. The semiconductor chip comprises a number n of several layers i. The layers i=2, i=3 and i=5 exhibit relatively slow performance because the interconnect geometries are smaller and the wiring density is greater relative to higher metal layers. Layer i=6 contains wide metal interconnect wires and will exhibit higher performance characteristics relative to lower metal layers. The data path logic is wired on layers i=2 and i=3. The launching clock path uses layer i=5 and the receiving clock path uses layer i=6. If a data path using layers i=2 and i=3 is launched by the latch receiving the clock signal of layer i=5 and if the same data path is received by the latch receiving the clock signal of layer i=6, the data signal arrives after the clock signal, since the launching clock path and data path are slow and the receiving clock path is fast. A setup violation can readily occur under this worst case scenario. Such timing violations may occur with a certain probability, if the parameters influencing the launching and receiving path are independent. In this case one parameter may be on the left most tail of the distribution in FIG. 1 and the other on the right most tail. If the data path was routed mostly using the metallization of the receiving clock path on the layer i=6, there could still be a variation in delay for the data path relative to the receiving clock path, but with a much smaller local variation 10.

Static timing analysis is a very powerful and widely used method to analyze the timing quality of a chip design. Circuit and wiring delays are propagated through the logic network and compared to required arrival times at certain test points, usually clocked registers or outputs. The delay of the circuit is given as the function of the input slew, the output capacitive load and environmental factors affecting performance, such as voltage and temperature. The actual delay varies on each individual chip, as shown in the local variation 10 in the probability distribution of FIG. 1. The average delay varies from chip to chip, as shown in the global variation 12 in the probability distribution of FIG. 1. Several manufacturing parameters influence the electrical properties of the design and hence the delay, including transistor channel width as well as spacing and width of interconnect wires on each metal layer.

Several simplifications are known. It is assumed that the worst or best case delay occurs at the extreme points of the distribution shown in FIG. 1. This means that it is sufficient to analyze the timing for all variations of the two extreme points of the distribution for each variable. In other words if there are k parameters x, there are $2^k$ different combinations of the parameters x that need to be analyzed. A typical value would be k=10.

With the approaches of the prior art, the layer assignment of the data path in the logic circuit does not consider variation at all. It is either controlled by wiring and congestion, by timing criteria not considering variations, or purely accidental.

The paper "Death, Taxes and Failing Chips" by Chandu Visweswariah (DAC 2003), incorporated herein by reference, describes the problems of manufacturing variations relating to the design of high-performance integrated circuits. In particular this paper pays attention to statistical timing analysis and enumerates desirable attributes that would render such an analysis capability.

The paper "First-Order Incremental Block-Based Statistical Timing Analysis" by Chandu Visweswariah et. al. (DAC 2004), incorporated herein by reference, describes a canonical first order delay model, that takes into account both correlated and independent randomness. In particular a statistical timing algorithm is disclosed to propagate timing quantities like arrival times and required arrival times through the timing graph in this canonical form. At the end of the statistical timing, the sensitivities of all timing quantities to each of the sources are available.

SUMMARY OF THE INVENTION

It is an object of the present invention to provide a method for routing the data paths in a semiconductor chip with a plurality of layers, which overcomes the above disadvantages. The main idea of the present invention is that the temporary behavior of manufacturing variations is considered in the routing of the data and clock paths. According to the present invention the delays of the data and clock paths on the single layers are considered during the routing process. The inventive method determines for every data path, which layer or layers will be used.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

BRIEF DESCRIPTION OF THE DRAWINGS

In the following detailed description of embodiments, reference is made to the accompanying drawings which form a part hereof, and in which are shown by way of illustration specific embodiments are described in sufficient detail to enable those skilled in the art to practice the invention, and it to be understood that other embodiments may be utilized and logical, structural, electrical and other changes may be made without departing from the scope of the present invention.

DETAILED DESCRIPTION OF THE INVENTION

Figure 1:
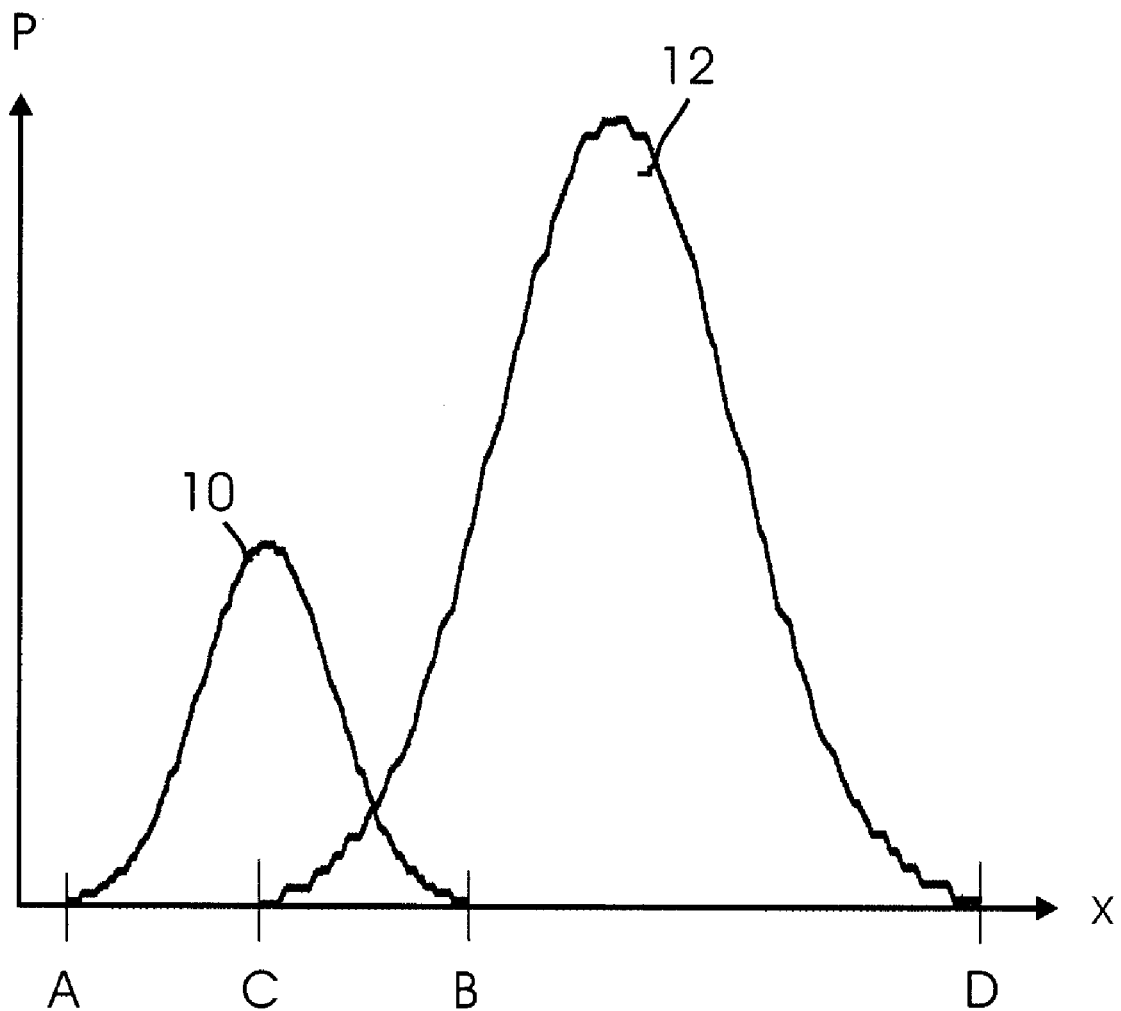
FIG. 1 shows a diagram of probability distributions of local and global variations.

According to the inventive method, it is assumed that the delay of each signal propagated across the chip is a linear and separable function of the underlying source of variation. It is the goal of the inventive method to minimize the spread of the probability distribution in FIG. 1.

The performance of an integrated circuit chip design may depend on the parameters x(0) to x(n). Each parameter x(1) to x(n) corresponds to one of the n layers and x(0) to the intrinsic delay that does not depend on the wiring on the metal layers. The setup test at a receiving latch may be described as $$DLCP+DLC<DRCP+TC-C, \quad (1)$$

wherein DLCP is a delay of the launching clock path, DRCP is a delay of the receiving clock path, and DLC is a delay of the data path logic. TC is an abbreviation for the cycle time. The abbreviation C is a positive constant, which models the setup time, the latch delay and other technology parameters.

The delay of each path is given by a sum of partial delay components. The delay of the launching clock path, for example, is given by the sum of the delays of launching clock trees for each parameter i $$DLCP=\text{Sum } \{Dlct(i)|i=0,\ldots,n\}. \quad (2)$$

In the same way the delay of the receiving clock path is given by the sum of the delays of receiving clock trees for each parameter i $$DRCP=\text{Sum } \{Drct(i)|i=0,\ldots,n\}. \quad (3)$$

Also the delay of the data path logic is given by the sum of the delays of single parts of the data path logic in every wired layer i $$DLC=\text{Sum } \{Dlc(i)|i=0,\ldots,n\}. \quad (4)$$

Accordingly, the setup test of equation (1) may be rewritten $$\text{Sum } \{Dlc(i)|i=0,\ldots,n\}$$
$$+\text{Sum } \{Dlct(i)-Drct(i)|i=0,\ldots,n\}<TC-C. \quad (5)$$

Figure 2:
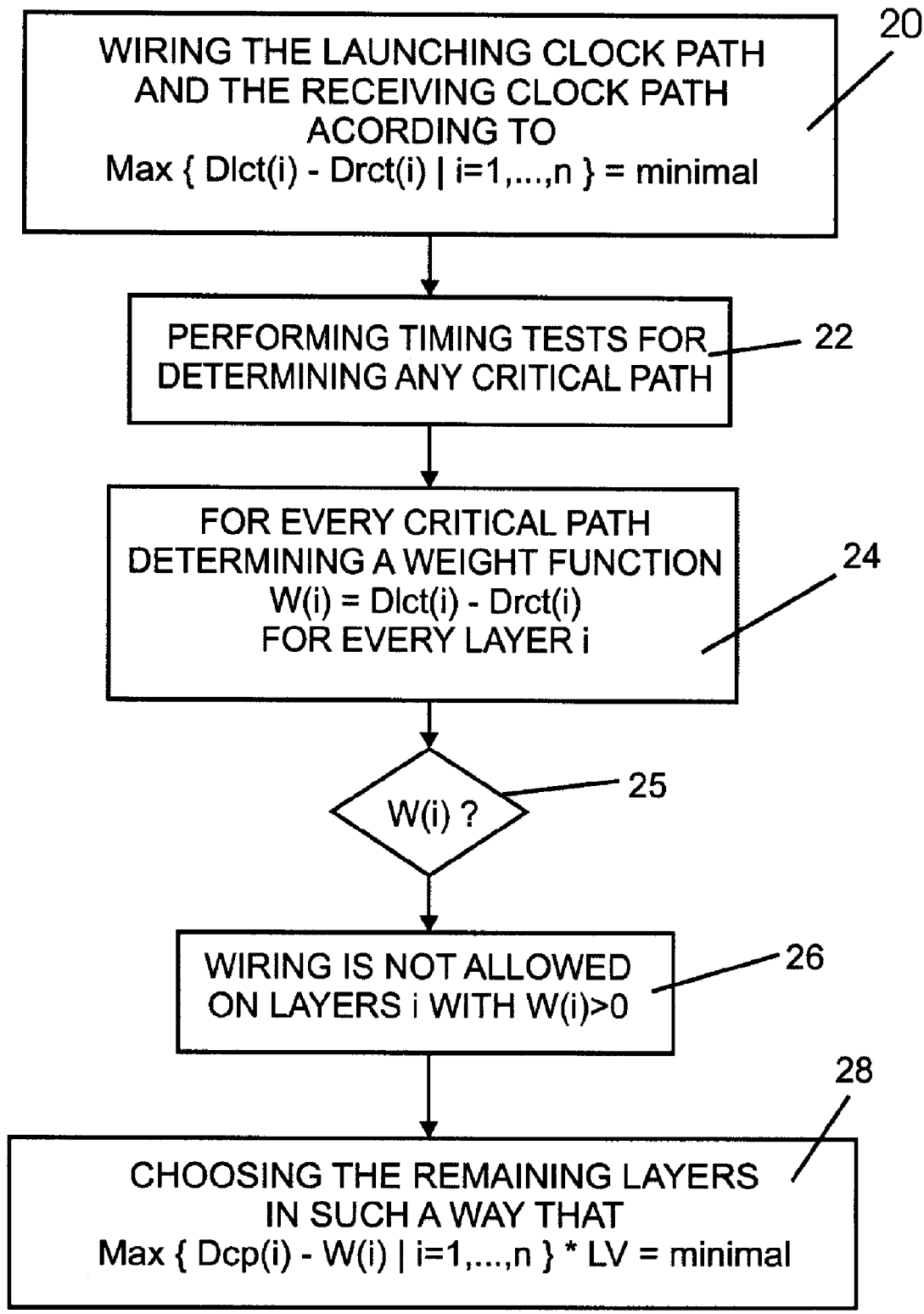
FIG. 2 illustrates a flow chart of a first embodiment of the method according to the present invention.

FIG. 2 illustrates a flow chart of a first embodiment of the method according to the present invention. The first embodiment of the inventive method relates to the task of producing a robust wire routing in an integrated circuit design for which all functional blocks and circuit macro library elements are placed in the chip layout.

In a first step 20 the launching and the receiving clock paths are wired such that $$\text{Max}\{Dlct(i)-Drct(i)|i=1,\ldots,n\}=\text{minimal}, \quad (6)$$

wherein Dlct(i) is a delay of a launching clock tree on the layer i and Drct(i) is a delay of a receiving clock tree on the layer i. Equation (6) optimizes the robustness such that the largest difference of both delays on one layer i has to be minimal. Otherwise the nominal timing would be optimized, if the equation $$\text{Sum}\{Drct(i)-Dlct(i)|i=1,\ldots,n\}=\text{maximal} \quad (7)$$

is satisfied for all paths.

In the next step 22, one or more timing tests are performed to find any signal paths that are timing critical (critical paths). A setup test is used in this example, however, the timing test may be a hold test, a clock gating test or an appropriate user-defined test. In the timing test the delays of the launching clock path DLCP, the receiving clock path DRCP and the data path logic DLC as well as the cycle time TC are measured. From the delays DLCP, DRCP, CLC and the cycle time TC critical paths are determined. A path is defined as critical, if the inequality (1) is satisfied with a small positive margin of slack.

In a step 24, for every critical path a weight function W(i) for every layer i is determined:

$$W(i)=Dlct(i)-Drct(i) \quad (8)$$

A critical path may be routed on multiple layers i, such that the signal traverses several layers between the source and sink to complete its routing. The value of the weight functions W(i) will be checked in a step 25. In a next step 26, it will be determined whether wiring on the layer i is allowed or not. Wiring is not allowed on layers i with a positive weight function W(i)>0. In step 28, the remaining layers are chosen in such a way that $$\text{Max}\{Dcp(i)-W(i)|i=1,\ldots,n\}*LV=\text{minimal}, \quad (9)$$

wherein Dcp(i) is a delay of the critical path on the layer i and LV is the local variation. The difference Dcp(i)−W(i) describes the sensitivity of the local variation on the layer i, which ultimately defines a layer assignment of the wiring that increases the robustness of the design without compromising circuit performance.

Figure 3:
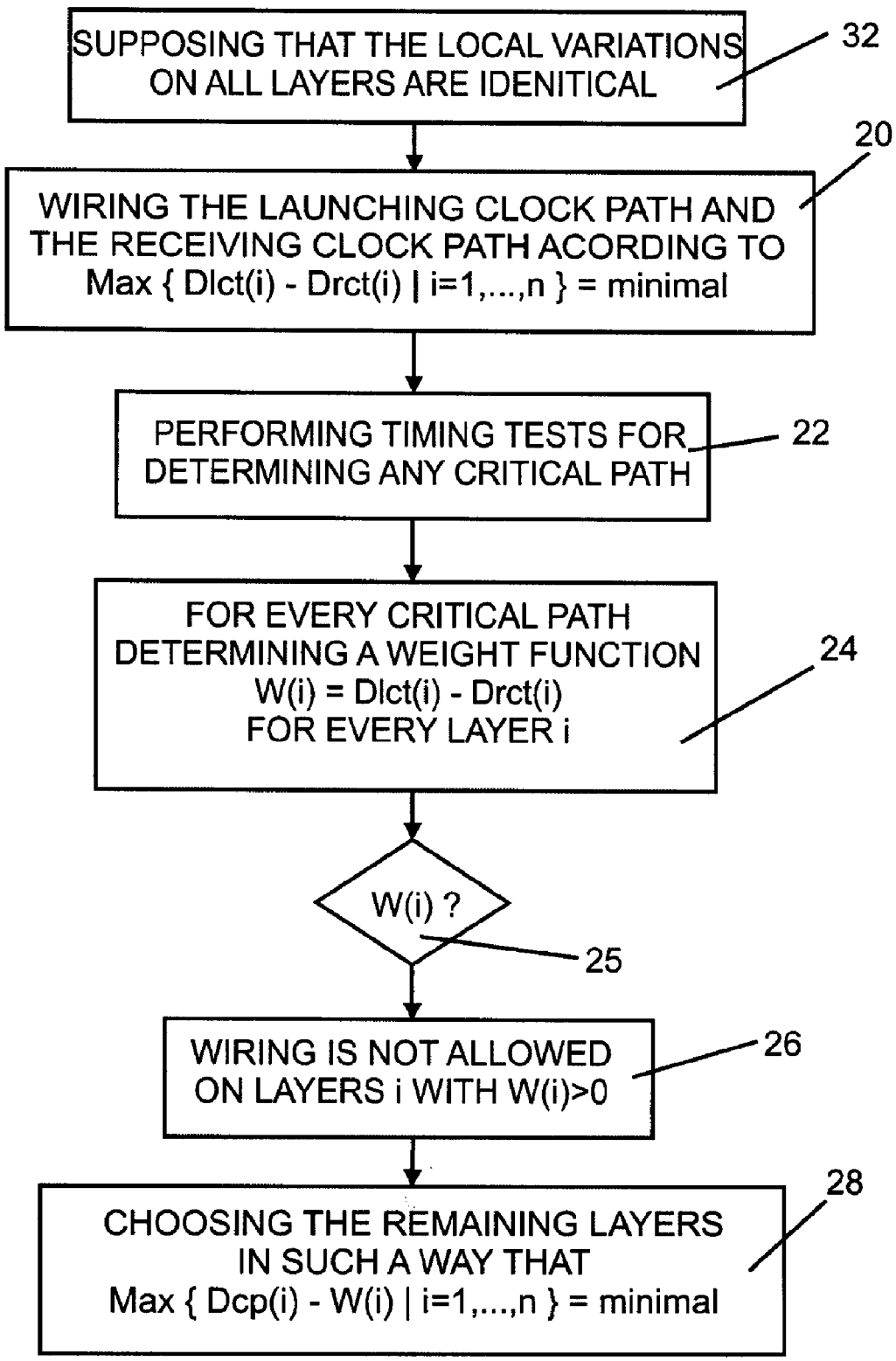
FIG. 3 illustrates a flow chart of a second embodiment of the method according to the present invention.

FIG. 3 illustrates a flow chart of a second embodiment of the method according to the present invention. The method according to the second embodiment is substantially the same as the method of the first embodiment. However, it is additionally proposed in a first step 32 that local variations on all layers i are identical. The other steps 22, 24, 25, 26 and 28 are the same as in the first embodiment.

Figure 4:
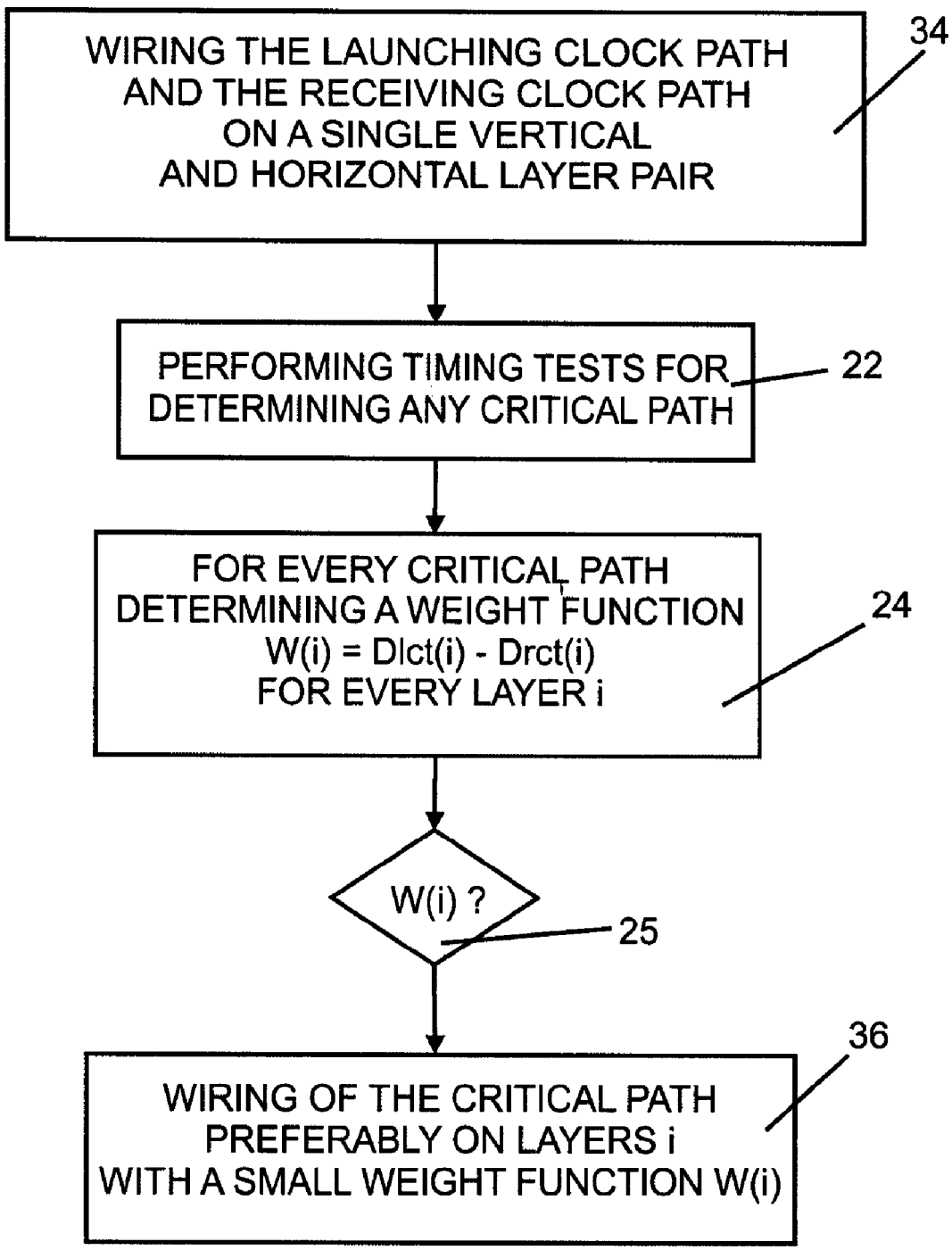
FIG. 4 illustrates a flow chart of a third embodiment of the method according to the present invention.

FIG. 4 illustrates a flow chart of a third embodiment of the method according to the present invention. The third embodiment is characterized by a heuristic layer selection. In a first step 34, the launching and the receiving clock path are wired on a single vertical and horizontal layer pair. In the next step 22, the timing test is performed to determine any critical path. In the step 24 for every critical path the weight function W(i) according to equation (4) is determined for every layer i. The wiring of the critical path is done preferably on the layers i with the smallest value weight function W(i) in step 36.

Figure 5:
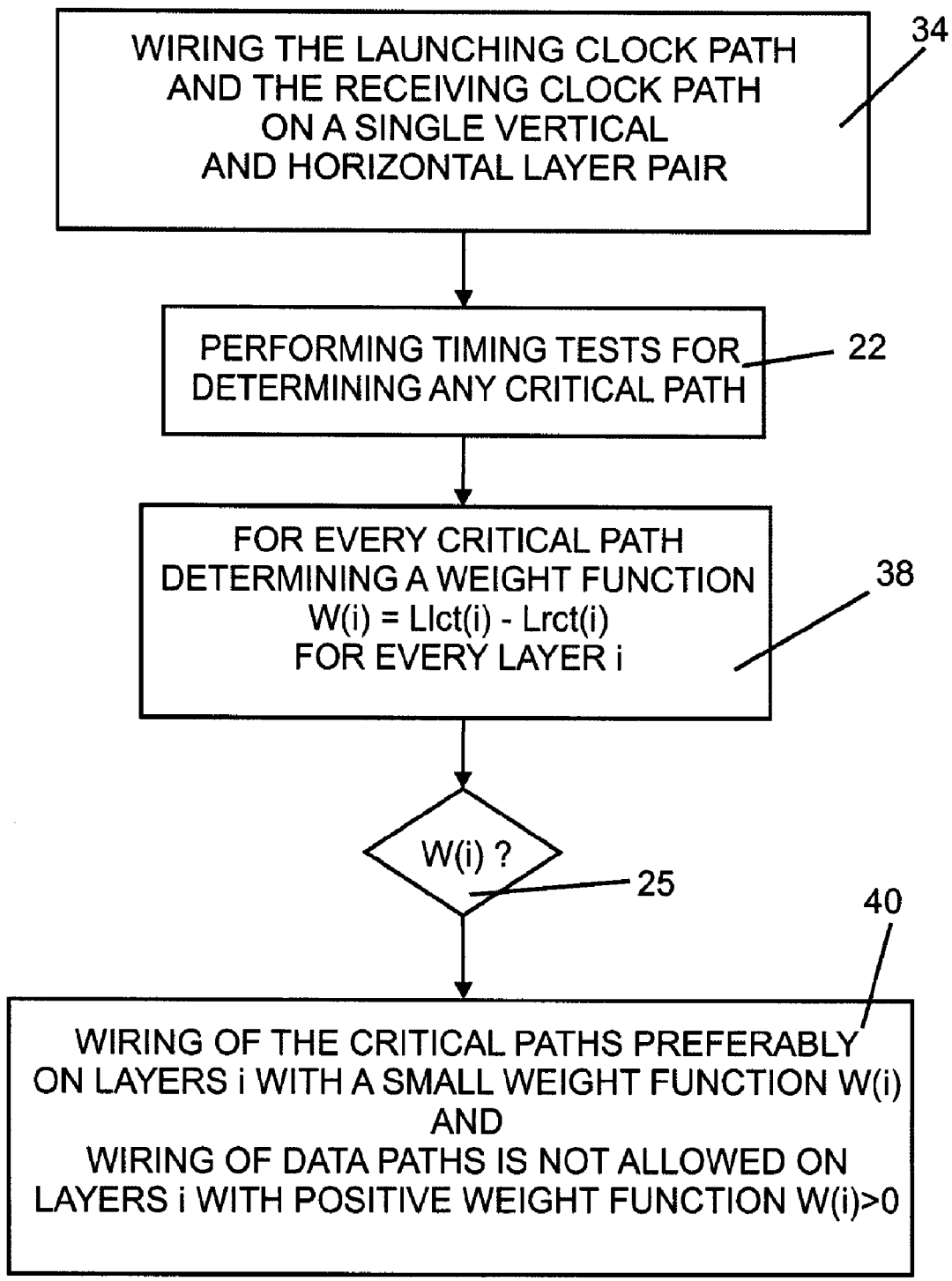
FIG. 5 illustrates a flow chart of a fourth embodiment of the method according to the present invention.

FIG. 5 illustrates a flow chart of a fourth embodiment of the method according to the present invention. Like the third embodiment the method of the fourth embodiment is characterized by the heuristic layer selection, but adds another weight function, W(i). In the first step 34, the launching and the receiving clock path are also wired on a single vertical and horizontal layer pair. As before, any critical paths are then determined by the timing tests performed in Step 22

The second weight function is determined for every critical path and for every layer i $$W(i) = Llct(i) - Lrct(i) \qquad (10)$$

wherein Llct(i) is the wire length of the launching clock tree on the layer i and Lrct(i) is the wire length of the receiving clock tree on layer i. In step 38, for every critical path the weight functions (10) will be determined for every layer i. In step 25, the weight functions W(i) will be checked. In a following step 40, the critical paths are wired preferably on the layers i with a small weight function W(i) and wiring of data paths is not allowed on layers i with positive weight functions W(i).

The inventive method will now be explained using an example wherein the launching and the receiving clock paths are routed on layer i=5 and on layer i=6 only. The weight function W(i=5) of the layer i=5 is positive and the weight function W(i=6) of the layer i=6 is negative. The weight functions W(i) for the other layers are not considered for this case. The weight function is defined as the difference between a property of the launching clock tree and the same property of the receiving clock tree on the same layer. If the weight function is positive for any layer, the wiring of the data path is not permitted on that layer. Accordingly, layer i=6 is the preferred layer to rout the data path, since it is not permitted to wire the data path on layer i=5.

If the above example is extended to a semiconductor chip with the slow layers i=2, i=3 and i=5, then the routing of fast layer i=6 will be considered again. If the data path logic is wired on the layers i=2 and i=3, the launching clock path uses layer i=5 and the receiving clock path uses layer i=6. Therefore the clock signal reaches the receiving latch early but the data signal arrives late. In this example, the timing robustness of the design would be improved by using the layer i=6 as the vertical wiring layer in the data path instead of the layer i=2.

Although the above examples describe the method using a set up test, other timing tests will produce comparable results. Such tests include, hold tests, user-defined tests, clock gating tests and others. To be operable for a hold-like test, the method herein requires slight modification, including the swapping of the receiving and launching paths. In addition, the inventive method does not require assignment of the clock path wiring layers before the data path wiring layers. The assignment can be done vice versa (data path first and then clock path) or simultaneously.

The advantage of the present invention is a reduction in the number of timing violations due to manufacturing variations. A further advantage is a higher yield at a given clock frequency or a higher clock frequency at a given yield. The present invention can also be embedded in a computer program product which comprises all the features enabling the implementation of the methods described herein. Further, when loaded in computer system, said computer program product is able to carry out these methods.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for routing data paths in an integrated circuit having a plurality of interconnect layers, said method comprising the steps of:
   wiring a launching clock path and a receiving clock path on one or more interconnect layers according to at least one predetermined condition;
   performing one or more timing tests to determine any critical paths;
   determining a weight function based on a plurality of modeled delays for every layer segment used to route each critical path, wherein said weight function is defined as the difference between a first property of the launching clock path and the same first property of the receiving clock path on each layer; and
   routing the data path only on a layer having a negative weight function, thereby ensuring compliance with a timing constraint for each critical path.

2. The method of claim 1, wherein in the launching clock path and the receiving clock path are wired such that a maximal difference between the delays of the launching clock tree and the receiving clock tree within one layer is as small as possible.

3. The method of claim 1, wherein the launching clock path and the receiving clock path are wired such that the sum of the differences between the delays of the launching clock path and the receiving clock path within one layer is as small as possible.

4. The method according to claim 1, wherein a segment of the data path that is not timing critical is wired on a plurality of the interconnect layers such that a local variation of the delay on each of the plurality of interconnect layers is as small as possible.

5. The method according to claim 1, wherein the delays of the receiving clock path and the launching clock path are assumed to be linear and separable functions corresponding to a plurality of variation sources.

6. The method according to claim 1, wherein the weight function is defined as the difference between a delay of the launching clock path and a delay of the receiving clock path in every layer segment used to route each critical path.

7. The method according to claim 1, wherein the weight function is defined as the difference between the wire length of the launching clock tree and the wire length of the receiving clock tree in every layer segment used to route each critical path.

8. The method according to claim 1, wherein the launching clock path and the receiving clock path are wired such that in every layer the difference between the delays of the launching clock path and the receiving clock path is as small as possible for every path.

9. The method according to claim 1, wherein the timing test comprises a setup test.

10. The method according to claim 1, wherein the timing test comprises a hold test.

11. The method according to claim 1, wherein the timing test comprises a clock gating test.

12. A system for routing data paths in an integrated circuit having a plurality of interconnect layers, comprising:
- a wire router adapted for wiring a launching clock path and a receiving clock path on one or more interconnect layers according to at least one predetermined condition;
- a static timing tool adapted to perform one or more timing tests to determine any critical paths;
- a wiring parameter extraction tool adapted for determining a weight function based on a plurality of modeled delays for every layer segment used to route each critical path, wherein said weight function is defined as the difference between a first property of the launching clock path and the same first property of the receiving clock path on each layer; and
- a routing constraints file used with the wire router to ensure routing of the data path only on a layer having a negative weight function, thereby ensuring compliance with a timing constraint for each critical path.

13. A program storage device readable by a machine, tangibly embodying a program of instructions executable by the machine to perform method steps for routing data paths in an integrated circuit having a plurality of interconnect layers, said method steps comprising: wiring a launching clock path and a receiving clock path on one or more interconnect layers according to at least one predetermined condition;
- performing one or more timing tests to determine any critical paths;
- determining a weight function based on a plurality of modeled delays for every layer segment used to route each critical path, wherein said weight function is defined as the difference between a first property of the launching clock path and the same first property of the receiving clock path on each layer; and
- routing the data path only on a layer having a negative weight function, thereby ensuring compliance with a timing constraint for each critical path.

14. The program storage device according to claim 13, wherein in the launching clock path and the receiving clock path are wired such that a maximal difference between the delays of the launching clock tree and the receiving clock tree within one layer is as small as possible.

15. The program storage device according to claim 13, wherein the launching clock path and the receiving clock path are wired such that the sum of the differences between the delays of the launching clock path and the receiving clock path within one layer is as small as possible.

16. The program storage device according to claim 13, wherein a segment of the data path that is not timing critical is wired on a plurality of the interconnect layers such that a local variation of the delay on each of the plurality of interconnect layers is as small as possible.

17. The program storage device according to claim 13, wherein the delays of the receiving clock path and the launching clock path are assumed to be linear and separable functions corresponding to a plurality of variation sources.

18. The program storage device according to claim 13, wherein the weight function is defined as the difference between the delay of the launching clock path and the delay of the receiving clock path in every layer segment used to route each critical path.

19. The program storage device according to claim 13, wherein the weight function is defined as the difference between a wire length of the launching clock tree and a wire length of the receiving clock tree in every layer segment used to route each critical path.

20. The program storage device according to claim 13, wherein the launching clock path and the receiving clock path are wired such that in every layer the difference between the delays of the launching clock path and the receiving clock path is as small as possible for every path.

21. The program storage device according to claim 13, wherein the timing test comprises a setup test.

22. The program storage device according to claim 13, wherein the timing test comprises a hold test.

23. The program storage device according to claim 13, wherein the timing test comprises a clock gating test.

24. The method according to claim 1, wherein the first property of the launching clock path comprises the modeled delay of that component of a launching clock path tree on a first layer, i.

25. The method according to claim 1, wherein the first property of the receiving clock path comprises the modeled delay of that component of a receiving clock path tree on a first layer, i.

* * * * *